United States Patent
Ha (10) Patent No.: US 12,340,033 B2
(45) Date of Patent: Jun. 24, 2025

(54) POINTER POSITIONING METHOD AND APPARATUS, AND INSTRUMENT

(71) Applicant: BOE Technology Group Co., Ltd., Beijing (CN)

(72) Inventor: Qian Ha, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 136 days.

(21) Appl. No.: 17/628,162

(22) PCT Filed: Mar. 26, 2021

(86) PCT No.: PCT/CN2021/083331
§ 371 (c)(1),
(2) Date: Jan. 18, 2022

(87) PCT Pub. No.: WO2021/190640
PCT Pub. Date: Sep. 30, 2021

(65) Prior Publication Data
US 2024/0036658 A1    Feb. 1, 2024

(30) Foreign Application Priority Data

Mar. 27, 2020 (CN) .......................... 202010232222.1

(51) Int. Cl.
*G06F 3/04812*    (2022.01)
*G06F 3/03*    (2006.01)
(Continued)

(52) U.S. Cl.
CPC ........ *G06F 3/0312* (2013.01); *G06F 3/04812* (2013.01); *G06F 3/04815* (2013.01); *G06F 3/0484* (2013.01); *G06F 3/0488* (2013.01)

(58) Field of Classification Search
None
See application file for complete search history.

(56) References Cited

U.S. PATENT DOCUMENTS

| 2016/0358322 | A1 | 12/2016 | Song et al. | |
| 2018/0253619 | A1* | 9/2018 | Petruk | H04N 23/57 |
| 2021/0174131 | A1* | 6/2021 | Schwartz | G06N 3/045 |

FOREIGN PATENT DOCUMENTS

| CN | 1789923 A | 6/2006 |
| CN | 103714329 A | 4/2014 |

(Continued)

OTHER PUBLICATIONS

Jiale, Han, et al. "Reading recognition method of analog measuring instruments based on improved hough transform." IEEE 2011 10th International Conference on Electronic Measurement & Instruments. vol. 3. IEEE, 2011. (Year: 2011).*

(Continued)

*Primary Examiner* — Amandeep Saini
*Assistant Examiner* — Caroline Tabancay Duffy
(74) *Attorney, Agent, or Firm* — IPro, PLLC (57) ABSTRACT

A pointer positioning method, an apparatus, and an instrument, relates to the technical field of instrument. The method comprises: on the condition that a virtual pointer rotates in a first dial image at a first preset angle, detecting quantities of first pixel points corresponding to a plurality of first rotation positions; according to the quantities of the first pixel points corresponding to the plurality of first rotation positions, determining a first target position where the virtual pointer is located; according to the first target position, determining a target angle value between a target pointer in an instrument dial corresponding to the first dial image and a reference position; and according to the target angle value, searching a target scale value corresponding to the target pointer from a corresponding relationship between preset angle values and scale values.

17 Claims, 5 Drawing Sheets

(51) Int. Cl.
  *G06F 3/04815* (2022.01)
  *G06F 3/0484* (2022.01)
  *G06F 3/0488* (2022.01)
  *G06T 11/00* (2006.01)

(56) References Cited

FOREIGN PATENT DOCUMENTS

| | | | | |
|---|---|---|---|---|
| CN | 110059622 A | * | 7/2019 | |
| CN | 110111387 A | | 8/2019 | |
| CN | 105091922 B | * | 9/2019 | |
| CN | 110245654 A | | 9/2019 | |
| CN | 110633679 A | * | 12/2019 | ......... G06K 9/00664 |
| CN | 111368823 A | * | 7/2020 | ............ G06K 9/325 |
| CN | 111428659 A | | 7/2020 | |
| CN | 112258379 A | | 1/2021 | |
| CN | 112347877 A | | 2/2021 | |
| JP | 2011196713 A | | 10/2011 | |

OTHER PUBLICATIONS

Jiale, L., Huaiyu, W., & Zhihuan, C. (2020). Automatic Identification Method of Pointer Meter under Complex Environment. Proceedings of the 2020 12th International Conference on Machine Learning and Computing, 276-282. https://doi.org/10.1145/3383972.3384047 (Year: 2020).*

Zhang, Lin, et al. "Pointer-type meter automatic reading from complex environment based on visual saliency." 2016 International Conference on Wavelet Analysis and Pattern Recognition (ICWAPR). IEEE, 2016. (Year: 2016).*

CN 202010232222.1 first office action.

* cited by examiner

POINTER POSITIONING METHOD AND APPARATUS, AND INSTRUMENT

CROSS REFERENCE TO RELEVANT APPLICATIONS

The present application claims the priority of the Chinese patent application filed on Mar. 27, 2020 before the Chinese Patent Office with the application number of 202010232222.1 and the title of "POINTER POSITIONING METHOD AND APPARATUS, AND INSTRUMENT", which is incorporated herein in its entirety by reference.

TECHNICAL FIELD

The present disclosure relates to the technical field of instrument, and in particularly relates to a pointer positioning method, an apparatus, and an instrument.

BACKGROUND

As a common measurement tool, instrument is widely used in industrial and agricultural production, science and technology, electricity measurement, daily life, and other aspects, such as barometers and thermometers in industrial production equipment, as well as voltmeters and ammeters in scientific experiments, etc.

Currently, the positioning method of the pointer in the instrument dial of the instrument is usually to collect a dial image of the instrument firstly, then identify a circle where the instrument dial in the dial image is located, and finally, identify the lines in the circle, such as using Hough transform to identify the lines in the circle, to get the position of the pointer.

SUMMARY

The embodiments of the present disclosure provide a pointer positioning method, an apparatus, and an instrument.

The present disclosure provides a pointer positioning method, including:
on the condition that a virtual pointer rotates in a first dial image at a first preset angle, detecting numbers of first pixel points corresponding to a plurality of first rotation positions;
according to the numbers of the first pixel points corresponding to the plurality of first rotation positions, determining a first target position where the virtual pointer is located;
according to the first target position, determining a target angle value between a target pointer in an instrument dial corresponding to the first dial image and a reference position; and
according to the target angle value, searching a target scale value corresponding to the target pointer from a corresponding relationship between preset angle values and scale values.

The present disclosure further provides a pointer positioning apparatus, including:
a first detection module configured to, on the condition that a virtual pointer rotates in a first dial image at a first preset angle, detect numbers of first pixel points corresponding to a plurality of first rotation positions;
a first target position determination module configured to, according to the numbers of the first pixel points corresponding to the plurality of first rotation positions, determining a first target position where the virtual pointer is located;
a target angle value determination module configured to, according to the first target position, determining a target angle value between a target pointer in an instrument dial corresponding to the first dial image and a reference position; and
a target scale value search module configured to, according to the target angle value, searching a target scale value corresponding to the target pointer from a corresponding relationship between preset angle values and scale values.

The present disclosure further provides an instrument including the above pointer positioning apparatus.

The present disclosure further provides a computing and processing device, including:
a memory, wherein the memory stores a computer-readable code; and
one or more processors, and when the computer-readable code is executed by the one or more processors, the computing and processing device executes the above pointer positioning method.

The present disclosure further provides a computer program including a computer-readable code, and when the computer-readable code is executed on a computing and processing device, the computer-readable code causes the computing and processing device to implement the above pointer positioning method.

The present disclosure further provides a computer-readable medium in which the above computer program is stored.

The above description is merely a summary of the technical solutions of the present disclosure. In order to more clearly know the elements of the present disclosure to enable the implementation according to the contents of the description, and in order to make the above and other purposes, features, and advantages of the present disclosure more apparent and understandable, the particular embodiments of the present disclosure are provided below.

DETAILED DESCRIPTION OF THE EMBODIMENTS

In order to make the objects, the features, and the advantages of the embodiments of the present disclosure clearer, the embodiments of the present disclosure may be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
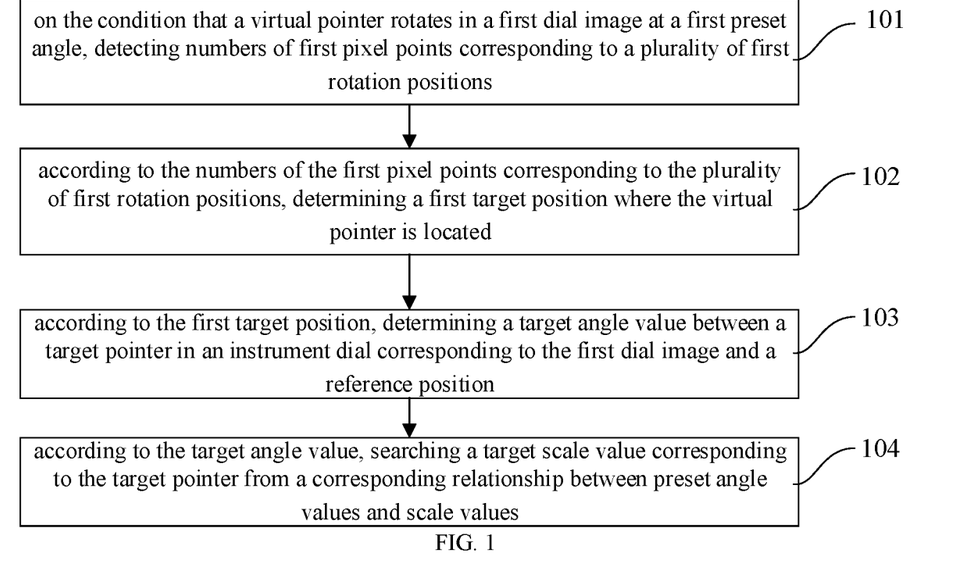
FIG. 1 is a flow chart of the pointer positioning method according to an embodiment of the present disclosure.

Referring to FIG. 1, which shows a flow chart of the pointer positioning method according to an embodiment of the present disclosure, it may specifically include the following steps:

Step 101, on the condition that a virtual pointer rotates in a first dial image at a first preset angle, detecting numbers of first pixel points corresponding to a plurality of first rotation positions.

In the embodiment of the present disclosure, a virtual pointer may be constructed in advance, and a pointer length of the constructed virtual pointer is 70% to 90% of a pointer length of the target pointer in the instrument dial, so that, subsequently, the position of the target pointer may be determined more accurately, and the target scale value may be read more accurately. The specific reason is that: one end of the target pointer in the instrument dial may overlap with the scale line and the value area in the instrument dial. If the pointer length of the constructed virtual pointer is equal to the pointer length of the target pointer in the instrument dial, when the virtual pointer performs a rotation scan in the first dial image, the scale line and the value area in the instrument dial may affect the scan result (that is, the quantity of first pixel points or the quantity of second pixel points at each rotation position). In order to ensure that most of the scan results are pixels included in the target pointer, the pointer length of the constructed virtual pointer needs to be set to 70% to 90% of the pointer length of the target pointer in the instrument dial.

In practical products, the target pointer is fixed in the instrument dial by the pointer rotation center. The two ends of the target pointer are located on both sides of the pointer rotation center, respectively. One end of the target pointer is used to point to the scale, and the other end of the target pointer is not used to point to the scale. The pointer length of the target pointer in the embodiment of the present disclosure refers to the length from the pointer rotation center of the instrument dial to the end of the target pointer pointing to the scale, rather than the total length of the target pointer; correspondingly, the pointer length of the virtual pointer also refers to the length from the pointer rotation center of the instrument dial to the end of the virtual pointer pointing to the scale.

The pointer width of the constructed virtual pointer is less than the pointer width of the target pointer in the instrument dial. Normally, the width of the target pointer is larger, and deviations may emerge easily when determining the position of the target pointer. Setting the width of the virtual pointer to be less than the pointer width of the target pointer may enable the positioning more accurate, when positioning the position of the target pointer according to the virtual pointer. Therefore, in the embodiment of the present disclosure, the virtual pointer is used to perform rotation scanning to determine the position of the target pointer, which may avoid the deviations of the target scale value reading caused by the deviations of the coarse pointer positioning.

In practical applications, when it is necessary to acquire the target scale value corresponding to the target pointer in the instrument dial, a camera is controlled to collect a third dial image corresponding to the instrument dial, and then the third dial image collected by the camera is acquired, wherein the third dial image is a color image, and then, the third dial image is performed by binarization processing to obtain a first dial image.

A pre-constructed virtual pointer is used to perform a rotation scan in the first dial image, to detect the quantity of the first pixel points corresponding to each first rotation position of the virtual pointer in the first dial image. Thereinto, the virtual pointer rotates one revolution at the interval of the first preset angle from the reference position, each time the first preset angle is rotated, the position of the virtual pointer in the first dial image is the first rotation position.

Figure 2:
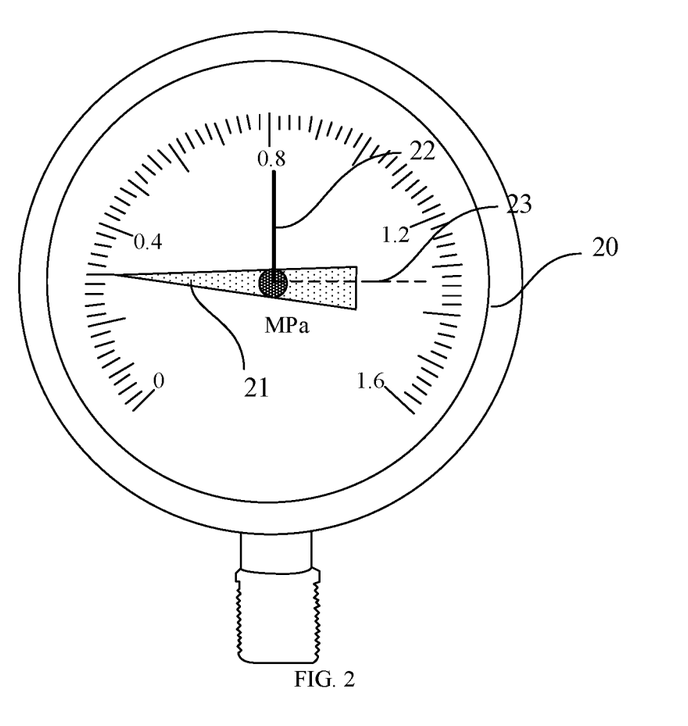
FIG. 2 is a schematic diagram of the instrument dial and the virtual pointer according to an embodiment of the present disclosure.

As shown in FIG. 2, the target pointer in the instrument dial 20 is 21, the virtual pointer is 22, and 23 is the reference position 0°. Assuming that the first preset angle is 1°, the virtual pointer 22 starts from the reference position 23 and rotates one revolution clockwise or counterclockwise at an interval of the first preset angle 1°, and each time the first preset angle 1° is rotated, the quantity of the first pixel points at the first rotation position of the virtual pointer in the first dial image is detected. Specifically, one first preset angle 1° is rotated from the reference position, at this time, the quantity of the first pixel points at the first rotation position is detected, and then one first preset angle 1° is rotated again from the position where the angle with the reference position is 1°, at this time, the quantity of the first pixel points at the second first rotation position is detected, and then one first preset angle of 1° is rotated from the position where the angle with the reference position is 2°, at this time, the quantity of the first pixel points at the third first rotation position is detected, and so on, the quantities of the first pixel points at 360 first rotation positions may be obtained totally.

Therein, the quantity of the first pixel points is related to the overlap degree between the virtual pointer and the target pointer. The quantity of the first pixel points refers to the quantity of pixel points with a gray value of 255 or a gray value of 0 at the first rotation position. When the background of the instrument dial in the first dial image is black and the color of the target pointer in the first dial image is white, the quantity of the first pixel points may be the quantity of pixel points with the gray value of 255 at the first rotation position; when the background of the instrument dial in the first dial image is white and the color of the target pointer in the first dial image is black, the quantity of the first pixel points may be the quantity of pixel points with the gray value of 0 at the first rotation position. In this way, the larger the quantity of the first pixel points, the higher the overlap degree between the virtual pointer and the target pointer.

Certainly, in order to position the target pointer more accurately, the value of the first preset angle may be set less, for example, the first preset angle is set to 0.5°, 0.2°, or 0.1°, and so on. The specific position of the reference position may be manually designated, and is not limited to the reference position 23 as shown in FIG. 2.

Step 102, according to the quantities of the first pixel points corresponding to the plurality of first rotation positions, determining a first target position where the virtual pointer is located.

In the embodiment of the present disclosure, the first target position of the virtual pointer is determined according to the detected quantities of the first pixel points at each first rotation position of the virtual pointer in the first dial image.

When the overlap degree between the virtual pointer and the target pointer is higher, the quantity of the first pixel points at the corresponding first rotation position is larger. Therefore, the first target position may be determined according to the maximum value of the quantity of the first pixel points at each first rotation position.

For example, what is detected is the quantities of the first pixel points at the 360 first rotation positions of the virtual pointer in the first dial image, compared with the quantities of the first pixel points at the 360 first rotation positions to find the maximum value among them. The quantity of the first pixel points at the $185^{th}$ first rotation position is supposed to be the largest, and the $185^{th}$ first rotation position is determined as the first target position.

Step 103, according to the first target position, determining a target angle value between a target pointer in an instrument dial corresponding to the first dial image and a reference position.

In the embodiment of the present disclosure, the target angle value between the target pointer in the instrument dial corresponding to the first dial image and the reference position is determined, according to the determined first target position.

In the first case, if the first preset angle is less than a preset threshold, that is, the selected value of the first preset angle is less, the quantities of the first pixel points at each first rotation position obtained in step 101 are the results of the fine scan, and the first target position may be directly determined as the position of the target pointer. Specifically, step 103 may include the following sub-steps:

Sub-step 1031, determining a first rotation times of the virtual pointer rotating from the reference position to the first target position, and calculating a first product value of the first rotation times and the first preset angle;

Sub-step 1032, determining the first product value as the first angle value;

Sub-step 1033, determining the first angle value as the target angle value between the target pointer in the instrument dial corresponding to the first dial image and the reference position.

For example, the virtual pointer is supposed to rotate N first preset angles from the reference position to reach the first target position, that is, the first rotation times is N and the first preset angle is M, then the first angle value between the first target position and the reference position is the first product value of the first rotation times and the first preset angle, that is, N*M, the target angle value between the target pointer in the instrument dial corresponding to the first dial image and the reference position is also N*M.

In the second case, if the first preset angle is larger than the preset threshold, that is, the selected value of the first preset angle is larger, the quantities of the first pixel points at each first rotation position obtained in step 101 are the results of the rough scan. In order to improve the positioning accuracy of the target pointer, it also needs to determine the rotation range for the virtual pointer to perform a rotation scan again according to the first target position. The virtual pointer performs a fine scan within the rotation range, and the second target position is determined according to the results of the fine scan. Finally, the target angle value between the target pointer in the instrument dial corresponding to the first dial image and the reference position is determined according to the second target position. The specific process may be referred to the descriptions from step 303 to step 306 below, and it is only briefly described here, moreover, the second case has a smaller amount of calculation compared with the first case.

Step 104, according to the target angle value, searching a target scale value corresponding to the target pointer from a corresponding relationship between preset angle values and scale values.

In the embodiment of the present disclosure, the corresponding relationship between the preset angle values and the scale values is constructed in advance. After determining the target angle value between the target pointer and the reference position, the target scale value corresponding to the target angle value is searched from the corresponding relationship between the preset angle values and the scale values, to obtain the target scale value corresponding to the target pointer.

As shown in FIG. 2, the target angle value is supposed to be 185°, from the corresponding relationship between the preset angle values and the scale values, the target scale value corresponding to the target angle value 185° is searched as 0.3 Mpa, then the target scale value corresponding to the target pointer is 0.3 Mpa.

In practical applications, after obtaining the target scale value corresponding to the target pointer, the target scale value may be sent to the designated device by wireless or wired means. Managers may view the target scale value in the designated device, to monitor the equipment monitored by the instrument corresponding to the instrument dial according to the target scale value.

It should be noted that the existing pointer positioning method usually collects the dial image of the instrument first, then recognizes the circle where the instrument dial in the dial image is located, and finally, recognizes the lines in the circle, but the circle where the instrument dial is located and the lines in the circle are often inaccurately recognized during the recognition process. The inaccurate reorganization may be caused by several reasons. For example, the inaccurate positioning of the circle center during the image recognition process, and the light reflection when collecting the dial image may cause the recognition inaccuracy. While the embodiment of the present disclosure positions the position of the target pointer according to the quantities of the first pixel points at each first rotation position, without recognizing the center of the circle where the instrument dial is located. In addition, even if the reflection cause interference to the first dial image, the lines formed by the reflection in the first dial image basically does not completely overlap with the first rotation position corresponding to the virtual pointer. When counting the quantities of the first pixel points at the first rotation positions, the impact caused by the reflection is very small, so that the quantities of the first pixel points at the first rotation positions are used to locate the position of the target pointer, which may also accurately recognize the position of the target pointer.

In the embodiment of the present disclosure, the virtual pointer is constructed in advance, and the virtual pointer is used to perform rotation scan in the first dial image, the quantity of the first pixel points at each first rotation position is compared to detect the position of the target pointer, and the corresponding relationship between the preset angle values and the scale values is used to determine the scale value of the target pointer. Since the position of the target pointer is located by the quantities of the first pixel points at each first rotation position, the position of the target pointer may be accurately identified, so that the reading of the target pointer is more accurate.

Figure 3:
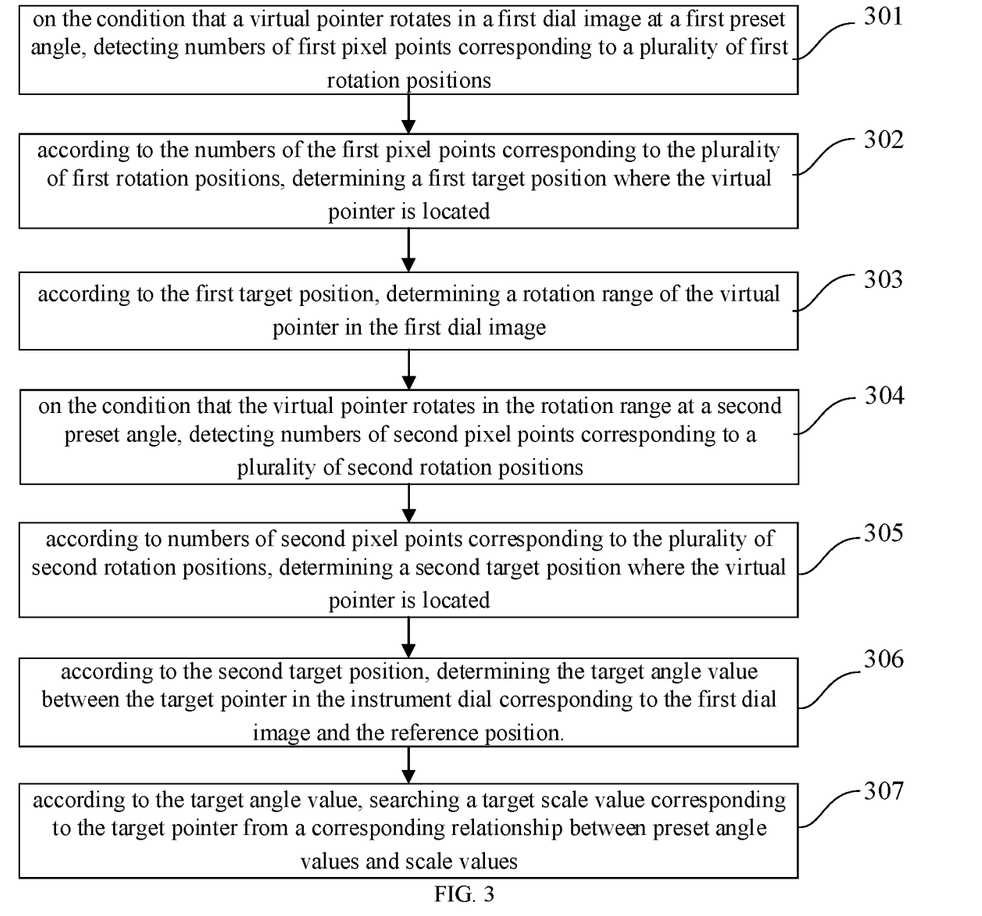
FIG. 3 is a specific flow chart of the pointer positioning method according to an embodiment of the present disclosure.

FIG. 3 shows a specific flow chart of the pointer positioning method according to an embodiment of the present disclosure, specifically, it may include the following steps:

Step 301, on the condition that a virtual pointer rotates in a first dial image at a first preset angle, detecting quantities of the first pixel points corresponding to a plurality of the first rotation positions.

In the embodiment of the present disclosure, the virtual pointer is pre-constructed, and the pre-constructed virtual pointer is used to perform a rotation scan in the first dial image, to detect the quantities of the first pixel points of the virtual pointer at each first rotation position in the first dial image. Thereof, the virtual pointer rotates one revolution at the interval of the first preset angle from the reference position, each time the first preset angle is rotated, the position of the virtual pointer in the first dial image is the first rotation position.

For example, the first preset angle is 1°, the virtual pointer starts from the reference position and rotates one revolution at the interval of the first preset angle 1°, and each time the first preset angle 1° is rotated, at this time, the quantity of the first pixel points at the first rotation position of the virtual pointer in the first dial image is detected. Therefore, the quantities of the first pixel points at 360 first rotation positions may be obtained.

Figure 4:
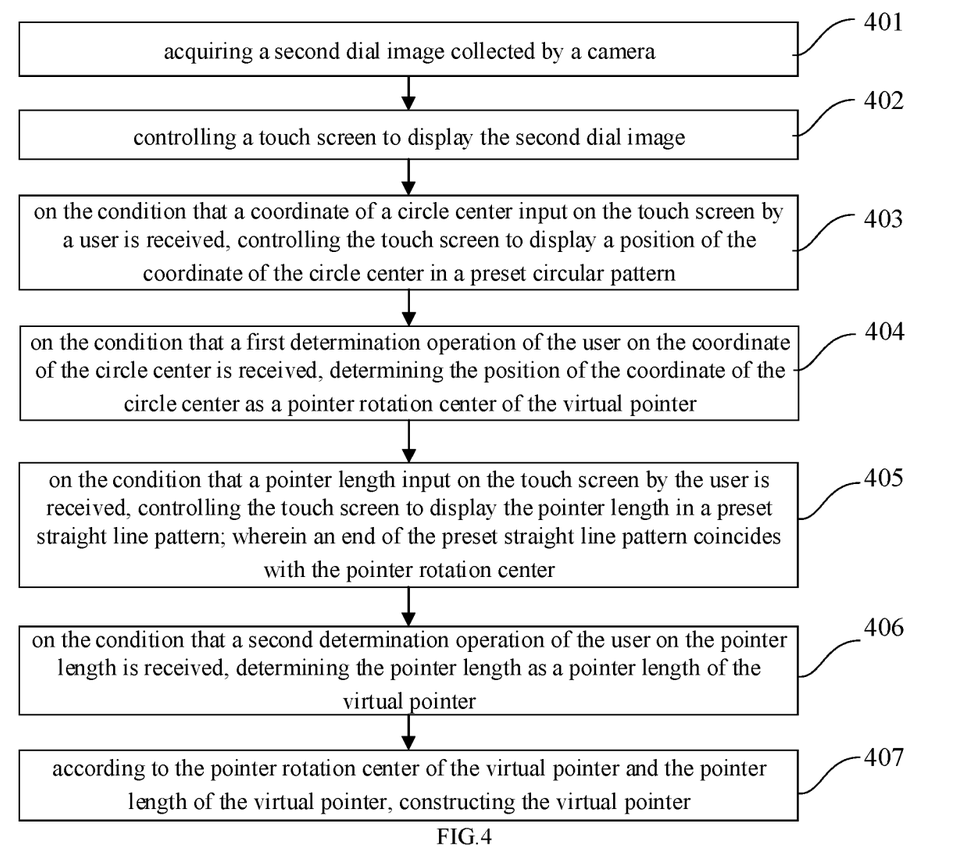
FIG. 4 is a construction flow chart of the virtual pointer according to an embodiment of the present disclosure.

FIG. 4 shows a construction flow chart of the virtual pointer according to an embodiment of the present disclosure, specifically, before the step 301, the method further includes step 401 to step 407:

Step 401, acquiring a second dial image collected by a camera;

Step 402, controlling a touch screen to display the second dial image;

Step 403, on the condition that a coordinate of a circle center input on the touch screen by a user is received, controlling the touch screen to display a position of the coordinate of the circle center in a preset circular pattern;

Step 404, on the condition that a first determination operation of the user on the coordinate of the circle center is received, determining the position of the coordinate of the circle center as a pointer rotation center of the virtual pointer;

Step 405, on the condition that a pointer length input on the touch screen by the user is received, controlling the touch screen to display the pointer length in a preset straight-line pattern; wherein one end of the preset straight-line pattern overlaps with the pointer rotation center;

Step 406, on the condition that a second determination operation of the user on the pointer length is received, determining the pointer length as a pointer length of the virtual pointer; and Step 407, according to the pointer rotation center of the virtual pointer and the pointer length of the virtual pointer, constructing the virtual pointer.

In the embodiment of the present disclosure, in order to construct the virtual pointer, firstly, it needs to control the camera to collect the second dial image corresponding to the instrument dial, and acquire the second dial image collected by the camera. The second dial image is a color image; of course, binarization processing may also be performed on the second dial image, subsequently, the touch screen may display the second dial image after binarization processing.

Then, the touch screen is controlled to display the second dial image corresponding to the instrument dial, and display an input box of the coordinate of the circle center, the user may input the coordinate of the circle center in the input box of the coordinate of the circle center on the touch screen, the touch screen receives the coordinate of the circle center input by the user on the touch screen, and then the touch screen is controlled to display the position of the coordinate of the circle center in the second dial image with a preset circular pattern, for example, a green circle pattern shows the position of the coordinate of the circle center, and an confirm option and a cancel option is displayed on the touch screen. The user observes whether the preset circular pattern overlaps with the pointer center of the instrument dial, if the preset circular pattern overlaps with the pointer center of the instrument dial, the user may touch the confirm option, and the touch screen receives the first determination operation of the coordinate of the circle center from the user, and the processor in the instrument may determine the position of the coordinate of the circle center as the pointer rotation center of the virtual pointer; when the user observes that the preset circular pattern does not overlap with the pointer center of the instrument dial, the user may touch the cancel option, and the touch screen receives the first cancel operation of the coordinate of the circle center from the user, the processor in the instrument controls the touch screen to redisplay the input box of the coordinate of the circle center for the user to input the coordinate of the circle center again.

After determining the pointer rotation center of the virtual pointer, the touch screen may be controlled to display an input box of the pointer length. The user may input the pointer length in the input box of the pointer length on the touch screen, and the touch screen receives the pointer length input by the user on the touch screen, and then the touch screen is controlled to display the pointer length in the second dial image with a preset straight-line pattern, and one end of the preset straight-line pattern overlaps with the pointer rotation center. In addition, a confirm option and a cancel option are displayed on the touch screen. When the user observes that the length of the preset straight-line pattern is between 70% and 90% of the pointer length of the target pointer, the user may touch the confirm option, and the touch screen receives the second determination operation of the pointer length from the user, the processor in the instrument determines the input pointer length as the pointer length of the virtual pointer; when the user observes that the length of the preset straight-line pattern is not between 70% and 90% of the pointer length of the target pointer, the user may touch the cancel option, then the touch screen receives the second cancel operation of the pointer length from the user, and the processor in the instrument controls the touch screen to redisplay the input box of the pointer length for the user to input the pointer length again.

Finally, according to the determined pointer rotation center of the virtual pointer and the pointer length of the virtual pointer, the virtual pointer is constructed.

The user manually inputs the coordinates of the circle center and the pointer length to construct the virtual pointer, which reduces the amount of calculation of the processor in the instrument, reduces the difficulty of the algorithm, and improves the stability of the processor operation.

Step 302, according to the quantities of the first pixel points corresponding to the plurality of first rotation positions, determining a first target position where the virtual pointer is located.

In the embodiment of the present disclosure, the first target position where the virtual pointer is located is determined according to the detected quantities of the first pixel points of the virtual pointer at each first rotation position in the first dial image.

Specifically, step 302 may include sub-step S11, sub-step S12, and sub-step S13:

Sub-step S11, on the condition that the quantities of the first pixel points corresponding to the plurality of first rotation positions have one first maximum value, determining a first rotation position corresponding to the first maximum value as the first target position;

Sub-step S12, on the condition that the quantities of the first pixel points corresponding to the plurality of first rotation positions have a plurality of first maximum values, determining a central position of the first rotation positions corresponding to the plurality of first maximum values;

Sub-step S13, determining the central position of the first rotation positions corresponding to the plurality of first maximum values as the first target position.

In practical applications, the first maximum value in the quantities of the first pixel points at each first rotation position may be one or more. When the quantity of the first maximum value in the quantities of the first pixel points at each first rotation position is one, the first rotation position corresponding to the first maximum value is determined as the first target position; when the first maximum value in the quantities of the first pixel points at each first rotation position is multiple, the central position of the first rotation positions corresponding to the multiple first maximum values is determined, and the central position of the first rotation positions corresponding to the multiple first maximum values is determined as the first target position.

It should be noted that, when there are multiple first maximum values in the quantities of the first pixel points at each first rotation position, the first rotation positions corresponding to the multiple first maximum values need to be continuous.

For example, the quantities of the first pixel points at the first rotation position 1, the first rotation position 2, and the first rotation position 3 are all first maximum value, the first preset angle is 1°, the angle between the first rotation position 1 and the reference position is 184°, and the angle between the first rotation position 2 and the reference position is 185°, the angle between the first rotation position 3 and the reference position is 186°, the average value of the three angles is calculated, and the average angle is 185°, in other words, the center position of the first rotation position 1, the first rotation position 2 and the first rotation position 3 is the first rotation position 2, and the first rotation position 2 is determined as the first target position.

Step 303, according to the first target position, determining a rotation range of the virtual pointer in the first dial image.

In the embodiment of the present disclosure, if the selected value of the first preset angle is larger, that is, the quantities of the first pixel points at each first rotation position obtained in step 301 are the results of the rough scan. In order to improve the positioning accuracy of the target pointer, it is also necessary to determine the rotation range for the virtual pointer to perform a rotation scan in the first dial image again according to the first target position.

Specifically, step 303 may include sub-step S21, sub-step S22, sub-step S23, and sub-step S24:

Sub-step S21, determining a first angle value between the first target position and the reference position;

Sub-step S22, determining a sum of the first angle value and a first preset value as a maximum value of the rotation range of the virtual pointer in the first dial image;

Sub-step S23, determining a difference between the first angle value and a second preset value as a minimum value of the rotation range of the virtual pointer in the first dial image;

Sub-step S24, according to the maximum value of the rotation range and the minimum value of the rotation range, determining the rotation range of the virtual pointer in the first dial image.

In the embodiment of the present disclosure, after the first target position is determined, the first angle value between the first target position and the reference position is determined. If the virtual pointer rotates N first preset angles from the reference position to reach the first target position, and the first preset angle is M, the first angle value between the first target position and the reference position is N*M.

Then, a first preset value is added to the first angle value, and the sum of the first angle value and the first preset value is determined as the maximum value of the rotation range of the virtual pointer in the first dial image; the second preset value is subtracted from the first angle value, and the difference between the first angle value and the second preset value is determined as the minimum value of the rotation range of the virtual pointer in the first dial image. Thereof, the first preset value and the second preset value may be set manually based on experience.

Finally, according to the maximum value of the rotation range and the minimum value of the rotation range, the rotation range of the virtual pointer in the first dial image is determined.

For example, if the first preset angle M is 1° and N is 185, that is, the virtual pointer rotates 185 first preset angles from the reference position to reach the first target position, then the first angle value between the first target position and the reference position is 185°. Assuming that the first preset value and the second preset value are both 3°, the maximum value of the rotation range of the virtual pointer in the first dial image is 188°, and the minimum value of the rotation range of the virtual pointer in the first dial image is 182°.

Step 304, on the condition that the virtual pointer rotates in the rotation range at a second preset angle, detecting quantities of second pixel points corresponding to a plurality of second rotation positions.

In the embodiment of the present disclosure, the virtual pointer performs a rotation scan again within the rotation range in the first dial image, and the quantities of the second pixel points at each second rotation position of the virtual pointer in the rotation range are detected, and the quantities of the second pixel points at each second rotation position are the results of the fine scan. Wherein, the virtual pointer rotates from the minimum value of the rotation range to the maximum value of the rotation range at the interval of the second preset angle, each time the second preset angle is rotated, the position of the virtual pointer in the first dial image is the second rotation position.

Figure 5:
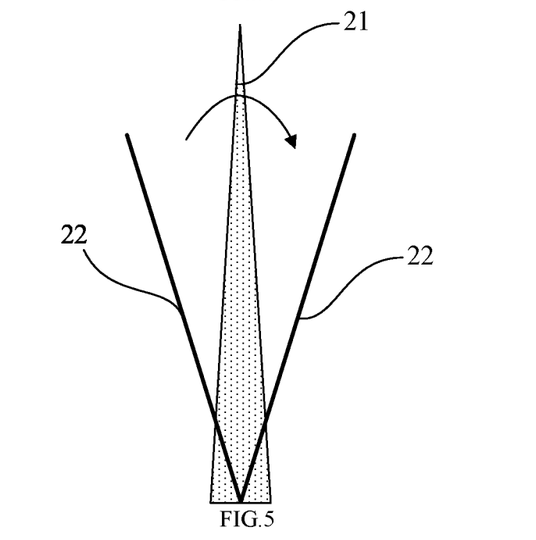
FIG. 5 is a schematic diagram of a fine scan of the virtual pointer according to an embodiment of the present disclosure.

As shown in FIG. 5, the target pointer 21 is in the rotation range determined according to the first target position. In order to position the target pointer 21 more accurately, the second preset angle is set to be 0.1°, and the virtual pointer 22 rotates from the minimum value of the rotation range to maximum value of the rotation range at the interval of the second preset angle and each time the second preset angle 0.1° is rotated, at this time, the quantity of the second pixel points at the second rotation position of the virtual pointer in the first dial image is detected; thereof, the virtual pointer 22 displayed on the left side refers to the position where the virtual pointer 22 starts the rotation scan, that is, the position corresponding to the minimum value of the rotation range, and the virtual pointer 22 displayed on the right side refers to the position where the virtual pointer 22 ends the rotation scan, that is, the position corresponding to the maximum value of the rotation range.

For example, if the maximum value of the rotation range of the virtual pointer in the first dial image is 188°, and the minimum value of the rotation range is 182°, then one second preset angle 0.1° is rotated from the position of the minimum value 182° of the rotation range, at this time, the quantity of the second pixel points at the first second rotation position is detected. Then, one second preset angle 0.1° is rotated again from the position with an angle of 182.1° from the reference position, at this time, the quantity of the second pixel points at the second rotation position is detected. Then, one second preset angle is rotated again from the position with an angle of 182.2° from the reference position, at this time, the quantity of the second pixel points at the third second rotation position is detected, and so on, the quantities of the second pixel points at 60 second rotation positions may be obtained totally.

The quantity of the second pixel points refers to the quantity of pixel points with the gray value of 255 or the gray value of 0 at the second rotation position. The specific statistics are the quantities of pixel points with the gray value of 255 or the gray value of 0, which are determined according to the background color of the instrument dial in the first dial image and the color of the target pointer.

It should be noted that, the rotation direction of the virtual pointer 22 is shown by the arrow in FIG. 5, in other words, the virtual pointer 22 rotates from the minimum value of the rotation range to the maximum value of the rotation range; certainly, the rotation direction of the virtual pointer 22 may also be from the maximum value of the rotation range to the minimum value of the rotation range.

Step 305, according to the quantities of the second pixel points corresponding to the plurality of second rotation positions, determining a second target position where the virtual pointer is located.

In the embodiment of the present disclosure, the second target position is determined according to the detected quantities of the second pixel points corresponding to the plurality of second rotation positions.

Specifically, step 305 may include sub-step S31, sub-step S32, and sub-step S33:

Sub-step S31, on the condition that the quantities of the second pixel points corresponding to the plurality of second rotation positions have one second maximum value, determining a second rotation position corresponding to the second maximum value as the second target position;

Sub-step S32, on the condition that the quantities of the second pixel points corresponding to the plurality of second rotation positions have a plurality of second maximum values, determining a central position of second rotation positions corresponding to the plurality of second maximum values; and Sub-step S33, determining the central position of the second rotation positions corresponding to the plurality of second maximum values as the second target position.

In practical applications, the second maximum value in the quantities of the second pixel points at each second rotation position may be one or more. When the second maximum value in the quantities of the second pixel points at each second rotation position is one, the second rotation position corresponding to the second maximum value is determined as the second target position; when the second maximum value in the quantities of the second pixel points at each second rotation position are multiple, the central position of the second rotation positions corresponding to the multiple second maximum values is determined, and the central position of the second rotation positions corresponding to the multiple second maximum values is determined as the second target position.

It should be noted that, when there are a plurality of second maximum values in the quantities of the second pixel points at each second rotation position, the second rotation positions corresponding to the multiple second maximum values need to be continuous.

For example, if the maximum value of the rotation range is 188°, the minimum value of the rotation range is 182°, and the second preset angle is 0.1°, the detected quantities of the second pixel points at the second rotation position 1, the second rotation position 2, and the second rotation position 3 in the rotation range are the second maximum values, the angle between the second rotation position 1 and the reference position is 185°, the angle between the second rotation position 2 and the reference position is 185.1°, and the angle between the second rotation position 3 and the reference position is 185.2°, the average value of the three angles is calculated, and an average angle of 185.1° is obtained, that is, the central position of the second rotation position 1, the second rotation position 2, and the second rotation position 3 is the second rotation position 2, and the second rotation position 2 is determined as the second target position.

Step 306, according to the second target position, determining the target angle value between the target pointer in the instrument dial corresponding to the first dial image and the reference position.

In the embodiment of the present disclosure, according to the determined second target position, the target angle value between the target pointer in the instrument dial corresponding to the first dial image and the reference position is determined, and the second target position is also the position where the target pointer in the instrument dial corresponding to the first dial image is located.

Specifically, step 306 may include sub-step S41 and sub-step S42:

Sub-step S41, determining a second angle value between the second target position and the reference position; and Sub-step S42, determining the second angle value as the target angle value between the target pointer in the instrument dial corresponding to the first dial image and the reference position.

In the embodiment of the present disclosure, after determining the second target position, the second angle value between the second target position and the reference position is determined. Specifically, sub-step S41 may include sub-step S411 and sub-step S412:

Sub-step S411, determining a second rotation times of the virtual pointer rotating from a minimum value of the rotation range to the second target position, and calculating a second product value of the second rotation times and the second preset angle; and Sub-step S412, determining a sum of the second product value and the minimum value of the rotation range as the second angle value.

For example, if the minimum value of the rotation range of the virtual pointer in the first dial image is L, and the virtual pointer rotates X second preset angles from the minimum value of the rotation range to reach the second target position, that is, the second rotation times is X, the second preset angle is Y and the second product value is X*Y, then the second angle value between the second target position and the reference position is the sum of the minimum value of the rotation range and the second product value, which is L+X*Y.

The second angle value between the second target position and the reference position is determined as the target angle value between the target pointer in the instrument dial corresponding to the first dial image and the reference position.

For example, if the minimum value L of the rotation range is 182°, the second preset angle Y is 0.1°, and X is 31, the target angle value between the target pointer and the reference position is 185.1°.

Step 307, according to the target angle value, searching a target scale value corresponding to the target pointer from a corresponding relationship between preset angle values and scale values.

In the embodiment of the present disclosure, the corresponding relationship between the preset angle values and the scale values is constructed in advance. After determining the target angle value between the target pointer and the reference position, from the corresponding relationship between the preset angle values and the scale values, the target scale value corresponding to the target angle value is searched, to get the target scale value corresponding to the target pointer.

Figure 6:
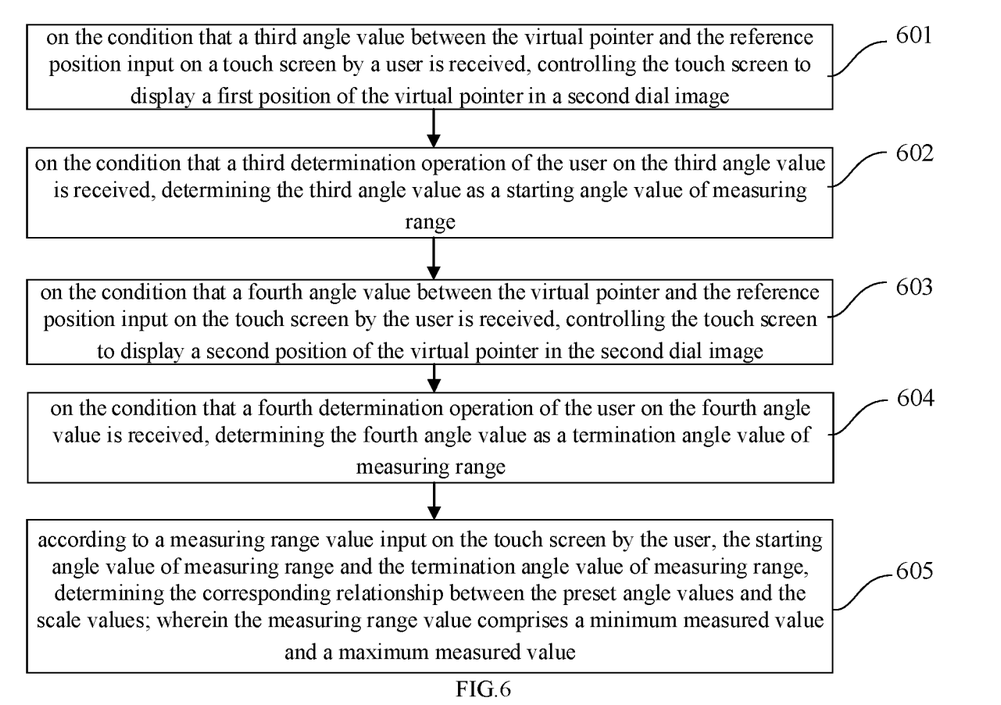
FIG. 6 is a flow chart of generating the corresponding relationship between the preset angle values and the scale values according to an embodiment of the present disclosure.

Referring to FIG. 6, which shows a flow chart of generating the corresponding relationship between the preset angle values and the scale values according to an embodiment of the present disclosure, before step 307, the method further includes step 601 to step 605:

Step 601, on the condition that a third angle value between the virtual pointer and the reference position input on a touch screen by a user is received, controlling the touch screen to display a first position of the virtual pointer in a second dial image;

Step 602, on the condition that a third determination operation of the user on the third angle value is received, determining the third angle value as a starting angle value of measuring range;

Step 603, on the condition that a fourth angle value between the virtual pointer and the reference position input on the touch screen by the user is received, controlling the touch screen to display a second position of the virtual pointer in the second dial image;

Step 604, on the condition that a fourth determination operation of the user on the fourth angle value is received, determining the fourth angle value as a termination angle value of measuring range; and Step 605, according to a measuring range value input on the touch screen by the user, the starting angle value of measuring range and the termination angle value of measuring range, determining the corresponding relationship between the preset angle values and the scale values; wherein the measuring range value comprises a minimum measured value and a maximum measured value.

In the embodiment of the present disclosure, in order to determine the corresponding relationship between the preset angle values and the scale values, firstly, it is necessary to control the touch screen to display the second dial image corresponding to the instrument dial, and control the touch screen to display an input box of the starting angle value of measuring range. The user may input the third angle value in the input box of the starting angle value of measuring range on the touch screen, the touch screen receives the third angle value between the virtual pointer and the reference position input by the user on the touch screen. Then the touch screen is controlled to display the first position of the virtual pointer in the second dial image. At this time, the angle between the first position and the reference position is the third angle value, and a confirm option and a cancel option are displayed on the touch screen. When the user observes that the first position of the virtual pointer in the second dial image overlaps with the scale corresponding to the minimum measured value in the measuring range value, the user may touch the confirm option, and the touch screen receives the third determination operation by the user on the third angle value, the processor in the instrument determines the third angle value as the starting angle value of measuring range; when the user observes that the first position of the virtual pointer in the second dial image does not overlap with the scale corresponding to the minimum measured value in the measuring range value, the user may touch the cancel option, the touch screen receives the third cancel operation by the user on the third angle value, and the processor in the instrument controls the touch screen to re-display the input box of the starting angle value of measuring range, for the user to input the third angle value again.

Correspondingly, the touch screen is controlled to display the input box of the termination angle value of measuring range. The user may input the fourth angle value in the input box of the termination angle value of measuring range on the touch screen, and the touch screen receives the fourth angle value between the virtual pointer and the reference position input by the user on the touch screen. Then the touch screen is controlled to display the second position of the virtual pointer in the second dial image. At this time, the angle between the second position and the reference position is the fourth angle value, and a confirm option and a cancel option are displayed on the touch screen. When the user observes that the second position of the virtual pointer in the second dial image overlaps with the scale corresponding to the maximum measured value in the measuring range value, the user may touch the confirm option, and the touch screen receives the fourth determination operation by the user on the fourth angle value, the processor in the instrument determines the fourth angle value as the termination angle value of measuring range; when the user observes that the second position of the virtual pointer in the second dial image does not overlap with the scale corresponding to the maximum measured value in the measuring range value, the user may touch the cancel option, the touch screen receives the fourth cancel operation by the user on the fourth angle value, and the processor in the instrument controls the touch screen to redisplay the input box of the termination angle value of measuring range, for the user to input the fourth angle value again.

Then, it is need to control the touch screen to display the input box of the measuring range. The user inputs the measuring range value in the input box of the measuring range on the touch screen, the measuring range value includes the minimum measured value and the maximum measured value. Finally, the processor in the instrument determines the corresponding relationship between the preset angle values and the scale values according to the measuring range value input by the user on the touch screen, the determined starting angle value of measuring range and the determined termination angle value of measuring range.

Since the scale corresponding to each measured value in the measuring range value is uniformly distributed in the instrument dial, there is a linear relationship between the angle values and the scale values corresponding to the scale, as shown in FIG. 2, after it is known that the minimum measured value in the measuring range value is 0, the maximum measured value is 1.6, the starting angle value of measuring range and termination angle value of measuring range, the corresponding relationship between the angle values and the scale values may be directly determined according to the minimum measured value, the maximum measured value, the starting angle value of measuring range and the termination angle value of measuring range.

It should be noted that, when generating the corresponding relationship between the preset angle values and the scale values, the pointer length of the virtual pointer may be consistent with the pointer length of the target pointer, so that the user may observe whether the virtual pointer overlaps with the scale corresponding to the minimum measured value, and the scale corresponding to the maximum measured value; and when the target scale value pointed by the target pointer is actually detected, the pointer length of the virtual pointer needs to be set to 70% to 90% of the pointer length of the target pointer.

The user manually inputs the minimum measured value, the maximum measured value, the starting angle value of measuring range, and the termination angle value of measuring range, to generate the corresponding relationship between the angle values and the scale values, which reduces the calculation amount of processor in the instrument, reduces the difficulty of the algorithm, and improves the stability of the processor operation.

It should be noted that, the second dial image in the embodiment of the present disclosure refers to a dial image collected by the camera when the virtual pointer is constructed and the corresponding relationship between the angle values and the scale values is generated, and the first dial image refers to a dial image collected by the camera when measuring the scale values of the target pointer.

In the embodiment of the present disclosure, the virtual pointer is constructed in advance, and the virtual pointer is used to perform a rough scan in the first dial image, to obtain the quantities of the first pixel points at each first rotation position, to determine the first target position. The rotation range of the virtual pointer performing a fine scan in the first dial image is determined according to the first target position, and the virtual pointer is used to perform the fine scan in the rotation range, to obtain the quantities of the second pixel points at each second rotation position in the rotation range, to determine the second target position. Then the target angle value between the target pointer and the reference position is further determined, and finally the scale value of the target pointer is determined through the corresponding relationship between the preset angle values and the scale values. Since the quantities of the first pixel points at each first rotation position and the quantities of the second pixel points at each second rotation position are used to locate the position of the target pointer, the position of the target pointer may be accurately identified, which makes the reading of the target pointer more accurate. And, by rough scanning first and then fine scanning, it may effectively reduce the calculation amount of the processor.

Figure 7:
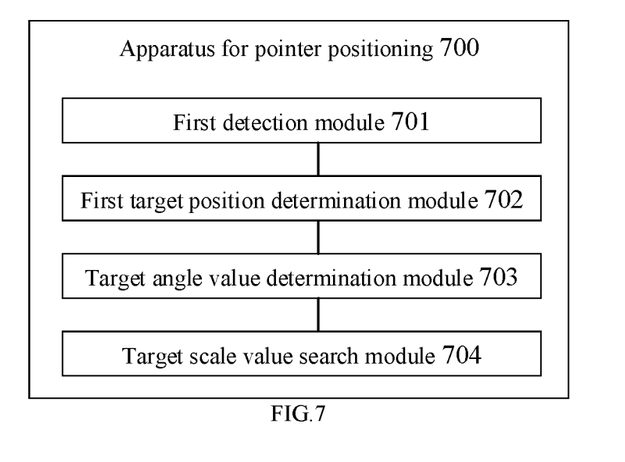
FIG. 7 is a structural block diagram of the pointer positioning apparatus according to an embodiment of the present disclosure.

Referring to FIG. 7, which shows a structural block diagram of the pointer positioning apparatus according to an embodiment of the present disclosure.

The pointer positioning apparatus 700 includes:
a first detection module 701 configured to, on the condition that a virtual pointer rotates in a first dial image at a first preset angle, detect quantities of first pixel points corresponding to a plurality of first rotation positions;
a first target position determination module 702 configured to, according to the quantities of the first pixel points corresponding to the plurality of first rotation positions, determining a first target position where the virtual pointer is located;
a target angle value determination module 703 configured to, according to the first target position, determining a target angle value between a target pointer in an instrument dial corresponding to the first dial image and a reference position; and
a target scale value search module 704 configured to, according to the target angle value, searching a target scale value corresponding to the target pointer from a corresponding relationship between preset angle values and scale values.

Optionally, the target angle value determination module 703 includes:
a rotation range determination sub-module configured to, according to the first target position, determining a rotation range of the virtual pointer in the first dial image;
a detection sub-module configured to, on the condition that the virtual pointer rotates in the rotation range at a second preset angle, detecting quantities of second pixel points corresponding to a plurality of second rotation positions;
a second target position determination sub-module configured to, according to the quantities of the second pixel points corresponding to the plurality of second rotation positions, determining a second target position where the virtual pointer is located; and
a target angle value determination sub-module configured to, according to the second target position, determining the target angle value between the target pointer in the instrument dial corresponding to the first dial image and the reference position.

Optionally, the first target position determination module 702 includes:
a target position first determination sub-module configured to, on the condition that the quantities of the first pixel points corresponding to the plurality of first rotation positions have one first maximum value, determining a first rotation position corresponding to the first maximum value as the first target position;
a central position determination sub-module configured to, on the condition that the quantities of the first pixel points corresponding to the plurality of first rotation positions have a plurality of first maximum values, determining a central position of the first rotation positions corresponding to the plurality of first maximum values; and
a target position second determination sub-module configured to, determining the central position of the first rotation positions corresponding to the plurality of first maximum values as the first target position.

Optionally, the rotation range determination sub-module includes:
  a first angle value determination unit configured to, determining a first angle value between the first target position and the reference position;
  a maximum value determination unit configured to, determining a sum of the first angle value and a first preset value as a maximum value of the rotation range of the virtual pointer in the first dial image;
  a minimum value determination unit configured to, determining a difference between the first angle value and a second preset value as a minimum value of the rotation range of the virtual pointer in the first dial image; and
  a rotation range determination unit configured to, according to the maximum value of the rotation range and the minimum value of the rotation range, determining the rotation range of the virtual pointer in the first dial image.

Optionally, the second target position determination sub-module includes:
  a target position first determination unit configured to, on the condition that the quantities of the second pixel points corresponding to the plurality of second rotation positions have one second maximum value, determining a second rotation position corresponding to the second maximum value as the second target position;
  a central position determination unit configured to, on the condition that the quantities of the second pixel points corresponding to the plurality of second rotation positions have a plurality of second maximum values, determining a central position of second rotation positions corresponding to the plurality of second maximum values; and
  a target position second determination unit configured to, determining the central position of the second rotation positions corresponding to the plurality of second maximum values as the second target position.

Optionally, the target angle value determination sub-module includes:
  a second angle value determination unit configured to, determining a second angle value between the second target position and the reference position; and
  a target angle determination unit configured to, determining the second angle value as the target angle value between the target pointer in the instrument dial corresponding to the first dial image and the reference position.

Optionally, the pointer positioning apparatus 700 further includes:
  a second dial image acquisition module configured to, acquiring a second dial image collected by a camera;
  a second dial image displaying module configured to, controlling a touch screen to display the second dial image;
  a coordinate of the circle center displaying module configured to, on the condition that a coordinate of a circle center input on the touch screen by a user is received, controlling the touch screen to display a position of the coordinate of the circle center in a preset circular pattern;
  a pointer rotation center determination module configured to, on the condition that a first determination operation of the user on the coordinate of the circle center is received, determining the position of the coordinate of the circle center as a pointer rotation center of the virtual pointer;
  a pointer length displaying module configured to, on the condition that a pointer length input on the touch screen by the user is received, controlling the touch screen to display the pointer length in a preset straight-line pattern; wherein one end of the preset straight-line pattern overlaps with the pointer rotation center;
  a pointer length determination module configured to, on the condition that a second determination operation of the user on the pointer length is received, determining the pointer length as a pointer length of the virtual pointer; and
  a virtual pointer construction module configured to, according to the pointer rotation center of the virtual pointer and the pointer length of the virtual pointer, constructing the virtual pointer.

Optionally, the pointer positioning apparatus 700 further includes:
  a first position displaying module configured to, on the condition that a third angle value between the virtual pointer and the reference position input on a touch screen by a user is received, controlling the touch screen to display a first position of the virtual pointer in a second dial image;
  a starting angle value of measuring range determination module configured to, on the condition that a third determination operation of the user on the third angle value is received, determining the third angle value as a starting angle value of measuring range;
  a second position displaying module configured to, on the condition that a fourth angle value between the virtual pointer and the reference position input on the touch screen by the user is received, controlling the touch screen to display a second position of the virtual pointer in the second dial image;
  a termination angle value of measuring range determination module configured to, on the condition that a fourth determination operation of the user on the fourth angle value is received, determining the fourth angle value as a termination angle value of measuring range; and
  a corresponding relationship determination module configured to, according to a measuring range value input on the touch screen by the user, the starting angle value of measuring range and the termination angle value of measuring range, determining the corresponding relationship between the preset angle values and the scale values; wherein the measuring range value comprises a minimum measured value and a maximum measured value.

Optionally, the pointer length of the virtual pointer is 70% to 90% of the pointer length of the target pointer.

Regarding the apparatus embodiment, since it is basically similar to the method embodiment, the description is relatively simple, and for related parts, please refer to the part of the description of the method embodiment.

In the embodiment of the present disclosure, the virtual pointer is constructed in advance, and the virtual pointer is used to perform rotation scan in the first dial image, the quantities of the first pixel points at each first rotation position is compared to detect the position of the target pointer, and the corresponding relationship between the preset angle values and the scale values is used to determine the scale value of the target pointer. Since the position of the target pointer is located by the quantities of the first pixel points at each first rotation position, the position of the target pointer may be accurately identified, so that the reading of the target pointer is more accurate.

Figure 8:
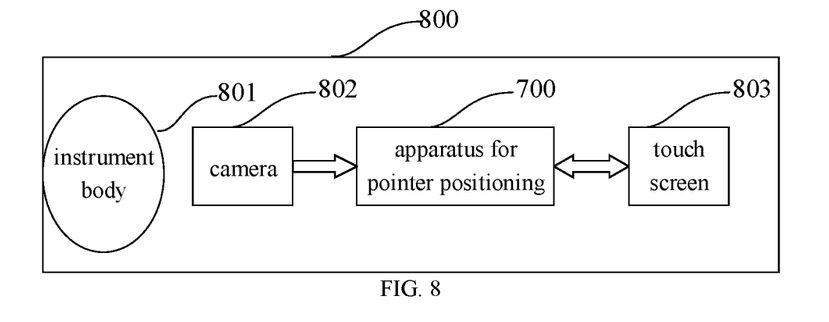
FIG. 8 is a schematic diagram of the composition structure of the instrument according to an embodiment of the present disclosure.

Referring to FIG. 8, which shows a schematic diagram of the composition structure of the instrument according to an embodiment of the present disclosure.

The embodiment of the present disclosure further provides an instrument 800, including the above pointer positioning apparatus 700.

In addition, the instrument 800 further includes an instrument body 801, a camera 802 and a touch screen 803; the instrument body 801 includes an instrument dial 20 and a target pointer 21.

Wherein, the camera 802 is configured to collect a first dial image (in fact, the third dial image is collected, however, after the collection, the third dial image needs to be binarization processed to obtain the first dial image) and a second dial image; the touch screen 803 is configured to receive a coordinate of the circle center, a pointer length, a third angle value, a fourth angle value and a measuring range value input by a user, and display the second dial image.

In addition, the touch screen 803 is also capable to receive a first determination operation, a first cancel operation, a second determination operation, a second cancel operation, a third determination operation, a third cancel operation, a fourth determination operation and a fourth cancel operation.

It should be noted that, in practical applications, the pointer positioning apparatus 700 may be the processor in the instrument 800, and the pointer positioning function is implemented by the processor in the instrument 800.

In the embodiment of the present disclosure, the virtual pointer is constructed in advance, and the virtual pointer is used to perform rotation scan in the first dial image, the quantities of the first pixel points at each first rotation position are compared to detect the position of the target pointer, and the corresponding relationship between the preset angle values and the scale values is used to determine the scale value of the target pointer. Since the position of the target pointer is located by the quantity of the first pixel points at each first rotation position, the position of the target pointer may be accurately identified, so that the reading of the target pointer is more accurate.

For the foregoing method embodiments, for the sake of simple description, they are all expressed as a series of action combinations. But those skilled in the art should know that the present disclosure is not limited by the described sequence of actions, because according to the present disclosure, some steps may be performed in other order or at the same time. Secondly, those skilled in the art should also know that the embodiments described in the specification are all preferred embodiments, and the involved actions and modules are not necessarily required by the present disclosure.

The above-described device embodiments are merely illustrative, wherein the units that are described as separate components may or may not be physically separate, and the components that are displayed as units may or may not be physical units; in other words, they may be located at the same location, and may also be distributed to a plurality of network units. Some or all of the modules may be selected according to the actual demands to realize the purposes of the solutions of the embodiments. A person skilled in the art may understand and implement the technical solutions without paying creative work.

Each component embodiment of the present disclosure may be implemented by hardware, or by software modules that are operated on one or more processors, or by a combination thereof. A person skilled in the art should understand that some or all of the functions of some or all of the components of the computing and processing device according to the embodiments of the present disclosure may be implemented by using a microprocessor or a digital signal processor (DSP) in practice. The present disclosure may also be implemented as apparatus or device programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or provided on a carrier signal, or provided in any other forms.

Figure 9:
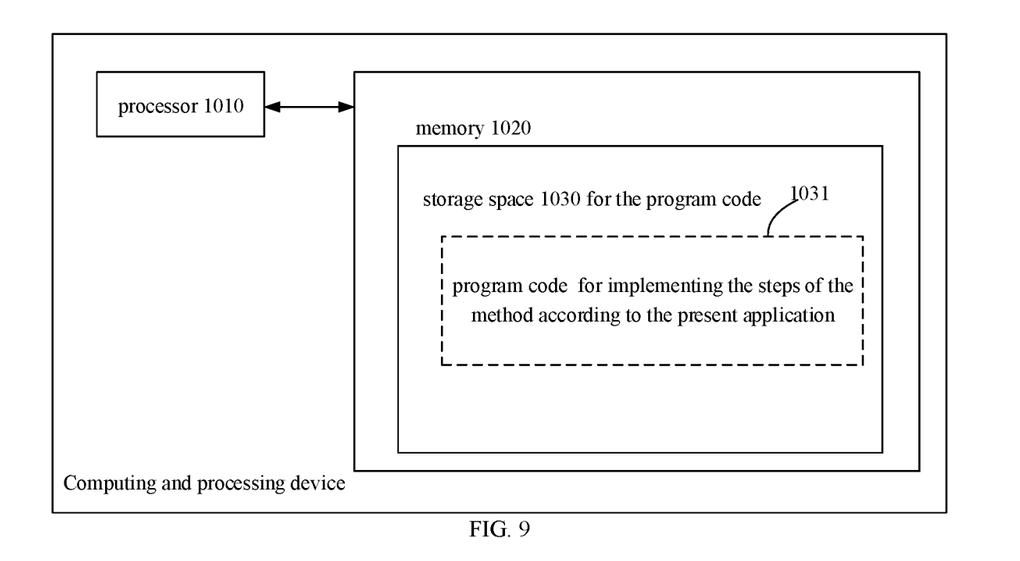
FIG. 9 schematically shows a block diagram of a computing and processing device for implementing the method according to the present disclosure.
Figure 10:
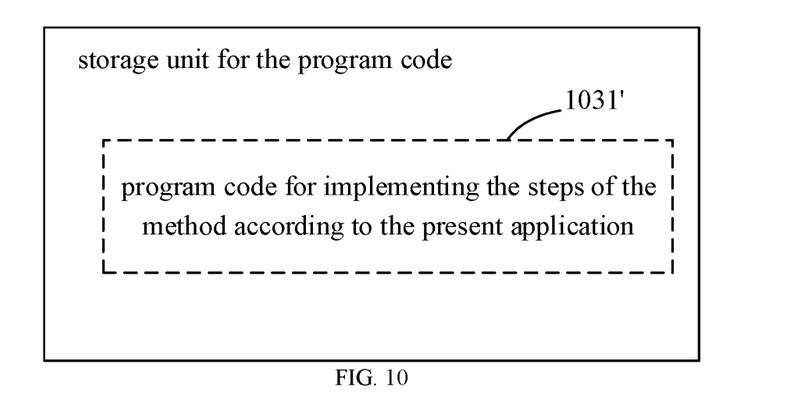
FIG. 10 schematically shows a storage unit for maintaining or carrying a program code for implementing the method according to the present disclosure.

For example, FIG. 9 shows a computing and processing device that may implement the method according to the present disclosure. The computing and processing device traditionally comprises a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1030 for program code may contain program codes 1031 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 10. The storage unit may have storage segments or storage spaces with similar arrangement to the memory 1020 of the computing and processing device in FIG. 9. The program codes may, for example, be compressed in a suitable form. Generally, the storage unit contains a computer-readable code 1031', which may be read by a processor like 1010. When those codes are executed by the computing and processing device, the codes cause the computing and processing device to implement each of the steps of the method described above.

In the specification provided here, a lot of specific details are explained. However, it may be understood that the embodiments of the present disclosure may be practiced without these specific details. In some instances, well-known methods, structures, and technologies are not shown in detail, so as not to obscure the understanding of this specification.

The embodiments of the description are described in the mode of progression, each of the embodiments emphatically describes the differences from the other embodiments, and the same or similar parts of the embodiments may refer to each other.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles, or devices that include a series of elements do not only include those elements, but also include other elements that are not explicitly listed, or include the elements that are inherent to such processes, methods, articles, or devices. Unless further limitation is set forth, an element defined by the wording "comprising a . . . " does not exclude additional same element in the process, method, article, or device comprising the element.

The pointer positioning method, the apparatus, and the instrument according to the present disclosure have been described in detail above. The principle and the embodiments of the present disclosure are described herein with reference to the particular examples, and the description of the above embodiments is merely intended to facilitate to understand the method according to the present disclosure and its core concept. Moreover, for a person skilled in the art, according to the concept of the present disclosure, the particular embodiments and the range of application may be varied. In conclusion, the contents of the description should not be understood as limiting the present disclosure.

The invention claimed is:

1. A pointer positioning method, wherein the method comprises:
on the condition that a virtual pointer rotates in a first dial image at a first preset angle, detecting quantities of first pixel points corresponding to a plurality of first rotation positions;
according to the quantities of the first pixel points corresponding to the plurality of first rotation positions, determining a first target position where the virtual pointer is located;
according to the first target position, determining a target angle value between a target pointer in an instrument dial corresponding to the first dial image and a reference position; and
according to the target angle value, searching a target scale value corresponding to the target pointer from a corresponding relationship between preset angle values and scale values;
wherein the first preset angle is larger than a preset threshold, and the step of according to the first target position, determining the target angle value between the target pointer in the instrument dial corresponding to the first dial image and the reference position comprises:
according to the first target position, determining a rotation range of the virtual pointer in the first dial image;
on the condition that the virtual pointer rotates in the rotation range at a second preset angle, detecting quantities of second pixel points corresponding to a plurality of second rotation positions;
according to the quantities of the second pixel points corresponding to the plurality of second rotation positions, determining a second target position where the virtual pointer is located; and
according to the second target position, determining the target angle value between the target pointer in the instrument dial corresponding to the first dial image and the reference position.

2. The method according to claim 1, wherein the step of according to the quantities of the first pixel points corresponding to the plurality of first rotation positions, determining the first target position where the virtual pointer is located comprises:
on the condition that the quantities of the first pixel points corresponding to the plurality of first rotation positions have one first maximum value, determining a first rotation position corresponding to the first maximum value as the first target position;
on the condition that the quantities of the first pixel points corresponding to the plurality of first rotation positions have a plurality of first maximum values, determining a central position of the first rotation positions corresponding to the plurality of first maximum values; and
determining the central position of the first rotation positions corresponding to the plurality of first maximum values as the first target position.

3. The method according to claim 1, wherein the step of according to the first target position, determining the rotation range of the virtual pointer in the first dial image comprises:
determining a first angle value between the first target position and the reference position;
determining a sum of the first angle value and a first preset value as a maximum value of the rotation range of the virtual pointer in the first dial image;
determining a difference between the first angle value and a second preset value as a minimum value of the rotation range of the virtual pointer in the first dial image; and
according to the maximum value of the rotation range and the minimum value of the rotation range, determining the rotation range of the virtual pointer in the first dial image.

4. The method according to claim 1, wherein the step of according to the quantities of the second pixel points corresponding to the plurality of second rotation positions, determining a second target position where the virtual pointer is located comprises:
on the condition that the quantities of the second pixel points corresponding to the plurality of second rotation positions have one second maximum value, determining a second rotation position corresponding to the second maximum value as the second target position;
on the condition that the quantities of the second pixel points corresponding to the plurality of second rotation positions have a plurality of second maximum values, determining a central position of second rotation positions corresponding to the plurality of second maximum values; and
determining the central position of the second rotation positions corresponding to the plurality of second maximum values as the second target position.

5. The method according to claim 1, wherein the step of according to the second target position, determining the target angle value between the target pointer in the instrument dial corresponding to the first dial image and the reference position comprises:
determining a second angle value between the second target position and the reference position; and
determining the second angle value as the target angle value between the target pointer in the instrument dial corresponding to the first dial image and the reference position.

6. The method according to claim 5, wherein the step of determining the second angle value between the second target position and the reference position comprises:
determining a second rotation times of the virtual pointer rotating from a minimum value of the rotation range to the second target position, and calculating a second product value of the second rotation times and the second preset angle; and
determining a sum of the second product value and the minimum value of the rotation range as the second angle value.

7. The method according to claim 1, wherein before the step of on the condition that the virtual pointer rotates in the first dial image at the first preset angle, detecting the quantities of the first pixel points corresponding to the plurality of first rotation positions, the method further comprises:
    acquiring a second dial image collected by a camera;
    controlling a touch screen to display the second dial image;
    on the condition that a coordinate of a circle center input on the touch screen by a user is received, controlling the touch screen to display a position of the coordinate of the circle center in a preset circular pattern;
    on the condition that a first determination operation of the user on the coordinate of the circle center is received, determining the position of the coordinate of the circle center as a pointer rotation center of the virtual pointer;
    on the condition that a pointer length input on the touch screen by the user is received, controlling the touch screen to display the pointer length in a preset straight-line pattern;
    wherein one end of the preset straight-line pattern overlaps with the pointer rotation center;
    on the condition that a second determination operation of the user on the pointer length is received, determining the pointer length as a pointer length of the virtual pointer; and
    according to the pointer rotation center of the virtual pointer and the pointer length of the virtual pointer, constructing the virtual pointer.

8. The method according to claim 1, wherein the virtual pointer rotates at an interval of the first preset angle from the reference position, when rotating the first preset angle at each time, a position of the virtual pointer in the first dial image is the first rotation position.

9. The method according to claim 1, wherein a pointer width of the virtual pointer is less than a pointer width of the target pointer.

10. A computing and processing device, comprising:
    a memory, wherein the memory stores a computer-readable code; and
    one or more processors, and when the computer-readable code is executed by the one or more processors, the computing and processing device executes the pointer positioning method according to claim 1.

11. An instrument, wherein the instrument comprises the computing and processing device according to claim 10.

12. The instrument according to claim 11, wherein the instrument further comprises an instrument body, a camera and a touch screen; the instrument body comprises an instrument dial and a target pointer;
    the camera is configured to collect a first dial image and a second dial image;
    the touch screen is configured to receive a coordinate of the circle center, a pointer length, a third angle value, a fourth angle value and a measuring range value input by a user, and display the second dial image.

13. The instrument according to claim 12, wherein the first dial image is an image obtained by binarization processing a third dial image collected by the camera; and
    the third dial image is a color image corresponding to the instrument dial collected by the camera.

14. The method according to claim 1, wherein before the step of according to the target angle value, searching the target scale value corresponding to the target pointer from the corresponding relationship between the preset angle values and the scale values, the method further comprises:
    on the condition that a third angle value between the virtual pointer and the reference position input on a touch screen by a user is received, controlling the touch screen to display a first position of the virtual pointer in a second dial image;
    on the condition that a third determination operation of the user on the third angle value is received, determining the third angle value as a starting angle value of measuring range;
    on the condition that a fourth angle value between the virtual pointer and the reference position input on the touch screen by the user is received, controlling the touch screen to display a second position of the virtual pointer in the second dial image;
    on the condition that a fourth determination operation of the user on the fourth angle value is received, determining the fourth angle value as a termination angle value of measuring range; and
    according to a measuring range value input on the touch screen by the user, the starting angle value of measuring range and the termination angle value of measuring range, determining the corresponding relationship between the preset angle values and the scale values; wherein the measuring range value comprises a minimum measured value and a maximum measured value.

15. A pointer positioning method, wherein the method comprises:
    on the condition that a virtual pointer rotates in a first dial image at a first preset angle, detecting quantities of first pixel points corresponding to a plurality of first rotation positions;
    according to the quantities of the first pixel points corresponding to the plurality of first rotation positions, determining a first target position where the virtual pointer is located;
    according to the first target position, determining a target angle value between a target pointer in an instrument dial corresponding to the first dial image and a reference position; and
    according to the target angle value, searching a target scale value corresponding to the target pointer from a corresponding relationship between preset angle values and scale values;
    wherein the first preset angle is less than a preset threshold, and the step of according to the first target position, determining the target angle value between the target pointer in the instrument dial corresponding to the first dial image and the reference position comprises:
    determining a first angle value between the first target position and the reference position; and
    determining the first angle value as the target angle value between the target pointer in the instrument dial corresponding to the first dial image and the reference position.

16. The method according to claim 15, wherein the step of determining the first angle value between the first target position and the reference position comprises:
    determining a first rotation times of the virtual pointer rotating from the reference position to the first target position, and calculating a first product value of the first rotation times and the first preset angle; and
    determining the first product value as the first angle value.

17. A pointer positioning method, wherein the method comprises:
    on the condition that a virtual pointer rotates in a first dial image at a first preset angle, detecting quantities of first pixel points corresponding to a plurality of first rotation positions;

according to the quantities of the first pixel points corresponding to the plurality of first rotation positions, determining a first target position where the virtual pointer is located;

according to the first target position, determining a target angle value between a target pointer in an instrument dial corresponding to the first dial image and a reference position; and according to the target angle value, searching a target scale value corresponding to the target pointer from a corresponding relationship between preset angle values and scale values;

wherein a pointer length of the virtual pointer is 70% to 90% of a pointer length of the target pointer.

* * * * *